(12) United States Patent
Mechin et al.

(10) Patent No.: US 6,911,500 B2
(45) Date of Patent: Jun. 28, 2005

(54) THERMOSETTING ELASTOMER COMPOSITION BASED ON MODIFIED POLYCYANURATE WITH IMPROVED THERMAL RESISTANCE

(75) Inventors: Francoise Mechin, Lyons (FR); Jean-Pierre Pascault, Villeurbanne (FR); Stéphanie Lambour, Lyons (FR); Jacques Ferrand, Briarres sur Essonne (FR)

(73) Assignee: Merylithe, Mery (FR)

( * ) Notice: Subject to any disclaimer, the term of this patent is extended or adjusted under 35 U.S.C. 154(b) by 182 days.

(21) Appl. No.: 10/333,741

(22) PCT Filed: Jul. 27, 2001

(86) PCT No.: PCT/FR01/02472

§ 371 (c)(1),
(2), (4) Date: Jun. 26, 2003

(87) PCT Pub. No.: WO02/10282

PCT Pub. Date: Feb. 7, 2002

(65) Prior Publication Data

US 2004/0030026 A1 Feb. 12, 2004

(30) Foreign Application Priority Data

Jul. 28, 2000 (FR) .............................................. 00 09934

(51) Int. Cl.⁷ ................................................. C08L 79/04
(52) U.S. Cl. ....................... 525/410; 525/418; 525/450; 525/464; 525/467; 525/474; 525/539; 525/941; 525/415
(58) Field of Search .................................. 525/410, 415, 525/418, 450, 464, 467, 474, 539, 941

(56) References Cited

FOREIGN PATENT DOCUMENTS

| EP | 0 311 341 | 4/1989 |
|---|---|---|
| EP | 0 816 438 | 1/1998 |
| WO | 00/18555 | 4/2000 |
| WO | 00/21585 | 4/2000 |
| WO | 00/27897 | 5/2000 |

OTHER PUBLICATIONS

XP–000727267; Barthélémy et al.; Modification of Polycyanurate Networks with Protic Additives Based on Polydimethylsiloxane; Macromol. Symp. 122, 167–172 (1997).
Patent Abstracts of Japan; 07 149952; Jun. 13, 1995; Toray Ind Inc.
McCormick et al.; Organometallic Catalysts for the Thermal and photocure of Cyanate Ester Resins; 3M Corporate Research Laboratories, 201–2N–21 3M Center, St. Paul, MN; pp. 460–461.
Bomal et al.; Une silice de nouvelle génération pour pneumatiques; L'Actualité Chimique; Jan.–Feb. 1996; pp 42–48.
Cabot Corporation Technical Data; Cab–O–Sil® TS–530 Treated Fumed Silica.

*Primary Examiner*—Randy Gulakowski
*Assistant Examiner*—Marc S. Zimmer
(74) *Attorney, Agent, or Firm*—Jacobson Holman PLLC

(57) ABSTRACT

The invention concerns a thermosetting elastomer composition based on modified polycyanurate with improved thermal resistance obtainable by a polymerization method in the presence of a catalyst (D) of a mixture comprising at least: (A) a cyanate, (B) a block copolymer consisting of: a) at least a central block (B1) non-miscible with the cyanate and sufficiently long to provide the composition with elastomeric character; and b) at least two terminal blocks (B2) located on each side of the central block and comprising groups reactive with the cyanate, each of the blocks (B2) being sufficiently long to be miscible with the cyanate; and (C) a mineral filler reactive with the cyanate, in proportions such that the ratio r is not less than 5, but remains less than a threshold value to avoid phase inversion, said method comprising steps which consist in: I) mixing (A), (B), (C) and (D) until a homogeneous mixture is obtained at a temperature higher than the melting point of (A) and of (B) but lower than about 130° C.; II) polymerizing the mixture at a temperature ranging between about 130 and about 170° C.; III) post-curing the polymerized mixture at a temperature not lower than about 200° C. to complete the reaction; the values of dsrupt and of derupt of the resulting composition being not more than +–30%. The invention also concerns the method for preparing said composition and its use.

14 Claims, No Drawings

THERMOSETTING ELASTOMER COMPOSITION BASED ON MODIFIED POLYCYANURATE WITH IMPROVED THERMAL RESISTANCE

This is a nationalization of PCT/FR01/02472, filed 27 Jul. 2001 and published in French.

The present invention relates to elastomer compositions having good heat resistance. It relates in particular to modified polycyanurates having improved heat resistance.

There exist various types of elastomeric polymers having good static mechanical properties in tension. Polyurethanes in particular are widely employed (for example, Adilithe® IV-95 or C36/H12MDI/3-DCM from SAMI). These types of polymer indeed have stresses at break of the order of 35 to 40 MPa and deformations at break of the order of 400% at ambient temperature; however, these properties undergo rapid and irreversible deterioration at high temperature (greater than 130° C.) until they lose more than 60% of their initial value. They are therefore not thermally stable. Other elastomers are thermally stable but they possess various disadvantages:

silicones of the Shin Etsu® KE 24 type have inadequate mechanical properties.
epoxies are excessively rigid.
fluoroelastomers of the Viton® type are too difficult to use, particularly for producing relatively thin coatings.

Mixtures of cyanates with compounds containing mobile hydrogen, especially polyols, so as to give modified polycyanurates have not been widely studied.

Surprisingly it has been discovered that certain polycyanurates, modified in accordance with the present invention, possess good heat resistance and are easy to employ while being neither too fragile nor excessively rigid.

The present invention accordingly provides a novel thermosetting elastomer composition based on modified polycyanurate with improved heat resistance, characterized in that it is obtainable by a process of polymerizing, using a catalyst (D), a mixture comprising:
(A) a cyanate,
(B) a block copolymer composed of
  a) at least one central block (B1) which is not miscible with the cyanate and which is sufficiently long to give the resulting composition an elastomeric nature, and
  b) at least two end blocks (B2) situated either side of the central block and containing groups which are reactive with the cyanate, each of said blocks (B2) being sufficiently long to be miscible with the cyanate, and
(C) a mineral filler which is reactive with the cyanate in proportions such that the ratio r is at least 5, but is not too high to prevent phase inversion, and advantageously is less than 10,
said process comprising the steps of:
I—mixing (A), (B), (C) and (D) to give a homogeneous mixture at a temperature greater than the melting temperature of (A) and (B) but less than approximately 130° C.,
II—polymerizing the mixture at a temperature of between approximately 130 and approximately 170° C.,
III—postcuring the polymerized mixture at a temperature greater than or equal to approximately 200° C., in order to complete the reaction and in that the $\Delta\sigma_{rupt}$ and $\Delta\epsilon_{rupt}$ values of the composition thus obtained are less than or equal to approximately ±30%.

The term "elastomeric nature of a composition" refers in the sense of the present invention to any semirigid composition having elongations at break of at least approximately 30%, this elongation being reversible at ambient temperature.

The term "sufficiently long" refers in the sense of the present invention:
for the blocks B1, to a numerical molar mass Mn of at least approximately 1 000 g/mol
for the blocks B2, to a numerical molar mass Mn of at least approximately 500 g/mol.

The term "phase inversion" refers in the sense of the present invention to the transition from a phase in which the polymer matrix is essentially composed of the block copolymer (B) to a phase in which the polymer matrix is essentially composed of the cyanate (A).

The term "mineral filler which is reactive with the cyanate" refers in the sense of the present invention to any mineral filler which carries groups which are reactive with the cyanate. Examples of such groups are hydroxyl or epoxy groups. Examples of mineral filler which is reactive with the cyanate according to the invention are, in particular, hydroxyl-functionalized alumina or else aluminosilicates and other silicates. The filler (C) is advantageously hydroxyl-functionalized silica, preferably Aerosil® 150 silica having the following characteristics:

particle size of between 7 and 40 nm
specific surface area=150 m$^2$/g
density=2.2 g/cm$^3$
3 SiOH groups/nm$^2$.

The term "ratio r" refers in the sense of the present invention to the ratio of the number of OCN groups present in the starting composition before reaction to the number of groups which are reactive with the cyanate that are present in the starting composition before reaction. These groups which are reactive with the cyanate may in particular originate from the copolymer, from the reactive filler and/or from the catalyst. The OCN groups generally originate from the cyanate (A).

The term "$\Delta\sigma_{rupt}$" refers in the sense of the present invention to the measurement of the variation between the stress at break measured at 110° C. at time t=0 just after polymerization and that measured at 110° C. at time t=10 days after aging at 160° C.

The term "$\Delta\epsilon_{rupt}$" refers in the sense of the present invention to the measurement of the variation between the elongation at break measured at 110° C. at time t=0 just after polymerization and that measured at 110° C. at time t=10 days after aging at 160° C.

Advantageously, after 10 days at 160° C., the $\epsilon_{rupt}$ of the composition according to the invention, measured at 110° C., is at least greater than or equal to approximately 40% and more advantageously still, after 10 days at 160° C., the $\sigma_{rupt}$ of the composition according to the invention, calculated at 110° C., is at least greater than or equal to approximately 3 MPa.

The cyanates which can be used in accordance with the invention may be of any type. The monomers involved may in particular be the following:

| Structure of the cyanate monomers | Commercial name/supplier/ physical state | Property of the monomers | | |
|---|---|---|---|---|
| | | Tg °C. | % H2O | DK 1 MHZ |
| BPACN (B 10) | AROCY B Ciba-Geigy BT-2000 Mitsubishi GC | 289 | 2.5 | 2.91 |
| TMBCN | AROCY M Ciba-Geigy CRYSTAL | 252 | 1.4 | 2.75 |
| 6FBPACN | AROCY F Ciba-Geigy CRYSTAL | 270 | 1.8 | 2.66 |
| BPECN (L 10) | AROCY L-10 Ciba-Geigy LIQUID | 258 | 2.4 | 2.98 |
| BCFB | RTX-366 Ciba-Geigy SEMI-SOLID | 192 | 0.7 | 2.64 |
| NOVOLAK CYANATE | PRIMASET PT Allied Signal REX-371 Ciba-Geigy SEMI-SOLID | 270 to 350 | 3.8 | 3.08 |
| DCPCN | XU-71787 Dow Chemical SEMI-SOLID | 244 | 1.4 | 2.80 |

The cyanates which can be used in accordance with the invention may also be advanced in conversion, by homopolymerization. The compound in question may, for example, be B30 (cyanate B10 homopolymerized to a level of 27%) or B50 (cyanate B10 homopolymerized to a level of 44%).

The blocks of the block copolymer (B) according to the invention may be:

for the central, cyanate-immiscible block (B1), for example a polydimethylsiloxane, polybutadiene, hydrogenated polybutadiene or polyfluoroether;

for the cyanate-miscible end blocks (B2), for example, polycaprolactones, polyesters or polycar-bonates.

The immiscible block provides the composition with the desired elastomeric nature and the outer blocks provide miscibility with the cyanate. The immiscible central block of the copolymer (B) is advantageously of the polysiloxane type. More advantageously still, the copolymer (B) is a polycaprolactone-polydimethyl-siloxane copolymer, preferably Tegomer®6440 sold by Goldschmidt, having the following characteristics:

| Specifications | Tegomer 6440 |
|---|---|
| Functional groups | Primary OHs |
| Functionality | 2 |
| No. of repeating units | n/m* = 30/18 |
| Molar mass | 6500 ± 600 g/mol |
| OH equivalent | 3300 g/mol |
| Melting point (PCL unit) | 54° C. |
| Appearance | White pellets |

*n represents the number of —Si(CH$_3$)$_2$O (dimethyl-siloxane) units and m the number of —CO(CH$_2$)$_5$O (caprolactone) units.

The present invention likewise provides a process for preparing a composition according to the invention, characterized in that it comprises the steps of:
I—mixing (A), (B), (C) and (D) to give a homogeneous mixture at a temperature greater than the melting temperature of (A) and (B) but less than approximately 130° C.,
II—polymerizing the mixture at a temperature of between approximately 130 and approximately 170° C.,
III—postcuring the polymerized mixture at a temperature greater than or equal to approximately 200° C., in order to complete the reaction.

Step I serves in effect for intimately mixing the various components of the composition according to the invention. It is therefore not necessary for the polymerization reaction to start during this step. The temperature applied must therefore be less than approximately 130° C.

Step II is the step of polymerizing the mixture. This polymerization can only start above approximately 130° C.

Step III, in turn, serves for completing the reaction. It is necessary to apply a high temperature in order to ensure that no residual monomer remains in the composition.

The catalysts (D) which can be used in the process according to the invention are advantageously activatable thermally and/or by UV irradiation. More advantageously still, they are organometallic derivatives or photocatalysts such as [CpFe(CO)$_2$]$_2$ or CpMn(CO)$_3$. More advantageously still, the catalyst is copper acetylacetonate in nonylphenol, preferably in a proportion of 100 ppm.

In one particular embodiment of the invention, step I of the process is conducted at approximately 90° C. for approximately 6 h, step II at approximately 170° C. for approximately 8 h, and step III at approximately 200° C. for approximately 2 h.

The temperature may be applied to the composition according to the invention in different ways. This may be done, in particular, in an oven or press.

In another particular embodiment of the invention, step II of the process is conducted in a press at approximately 170° C. for approximately 4 h and step III is conducted in a press at approximately 200° C. for approximately 2 h.

The present invention likewise provides for the use of the composition according to the invention as a coating for rollers, in particular of printing machines, as an encapsulant for components, as substrates for micro-electronics, or as a binder for propellants or for composites.

The following examples of the composition according to the invention are given by way of illustration and have no limiting character.

PREPARATION EXAMPLES OF A POLYMER ACCORDING TO THE INVENTION

Experimental Procedure a) mixing of the reactants (cyanate and polyol) in a vessel at a temperature greater than their melting point (80° C.) followed by addition at this temperature of the catalyst and of a portion of the filler, so as to make the mixture sufficiently solid to rest on the rollers of the calender b) mixing of the remainder of the filler on the calender at 80° C.

c) press or oven.

The temperature cycle used to carry out the examples of compositions according to the invention is 6 h at 90° C., 8 h at 170° C., and 2 h at 200° C.

For each example, the proportions of each of the constituents are indicated in table 1 below.

TABLE 1

Proportions introduced into the formulations in accordance with the proportion of silica.

| Examples | % of silica introduced by weight | Mass of Tegomer ® 6440 in g | Mass of cyanate B 10 in g | Mass of Aerosil ® 150 silica in g | Mass of catalyst Copper acetylacetonate in nonylphenol in g |
|---|---|---|---|---|---|
| 1 | 10 | 100 | 28.79 | 14.31 | 0.2998 |
| 2 | 15 | 100 | 33.62 | 23.58 | 0.35006 |
| 3 | 20 | 100 | 39.5 | 34.87 | 0.41129 |
| 4 | 27 | 100 | 50.25 | 55.57 | 0.52322 |

Experimental Protocol of the Aging Test at 160° C.:

The materials are prepared in the form of sheets approximately 1 mm thick, which are cut into squares of 7 cm/7 cm.

These sheets, wrapped in aluminum paper which is regarded as inert toward the composition according to the invention, are placed in an oven at a temperature of 160° C., controlled to ±2° C.

Each sheet is removed from the oven after a specified time (0, 6, 7, 24, 72 hours, 5, 9 or 10 days).

After having undergone the aging test, five standardized tension specimens of type H3 (AFNOR standard T51-034) are cut from this sheet using a punch.

The static mechanical properties are subsequently evaluated in accordance with AFNOR standard T51-034 using a J. J. Lloyd MK30 tensile machine at a speed of 50 mm/min, in a controlled-climate chamber regulated at ±1° C. or at ambient temperature or at 110° C. in accordance with the temperature range over which the rubbery plateau of the materials under test extends.

For each example and for other materials, serving for comparison, the results of the tests are indicated in tables 2 to 5 below:

TABLE 2

Course of the stress at break, σ, in MPa, measured at 110° C., as a function of the aging time at 160° C.

| Time (h) | EX 1 | EX 2 | EX 3 | EX 4 | Viton ® | Shin Etsu ® KE24 |
|---|---|---|---|---|---|---|
| 0 | 2.615 | 3.02241 | 3.4615 | 3.74138 | 5.009 | 4.57194 |
| 24 | 2.15267 | 2.467 | 3.58167 | 4.755 | 4.80425 | 3.1966 |
| 72 | 1.74633 | 2.08 | 3.69725 | 3.82767 | 4.94525 | 3.62825 |
| 120 | 1.73967 | 2.256 | 3.385 | 3.8396 | 5.35475 | 2.78375 |
| 216 to 240 | 1.342 | 1.852 | 3.2 | 3.62833 | 5.6755 | 3.2272 |

TABLE 3

Course of the elongation at break, ε, in %, measured at 110° C., as a function of the aging time at 160° C.

| Time (h) | EX 1 | EX 2 | EX 3 | EX 4 | Viton ® | Shin Etsu ® KE24 |
|---|---|---|---|---|---|---|
| 0 | 110.818 | 63.285 | 42.3425 | 41.1244 | 116.35 | 44.8475 |
| 24 | 169.533 | 96.775 | 71.3567 | 41.5133 | 101.383 | 43.52 |
| 72 | 168.6 | 103.903 | 86.055 | 57.34 | 101.728 | 40.1625 |
| 122 | 154.775 | 117.5 | 86.5625 | 59.042 | 99.3525 | 35.8675 |
| 216 | 117.20 | 67.185 | 75.395 | 45.2067 | 105 | 41.1375 |

The variations in $\sigma_{rupt}$ and $\epsilon_{rupt}$ calculated at 110° C. for each example and for other materials in the course of the aging test at 160° C. are collated in table 4.

TABLE 4

Variations in the mechanical properties at break measured at 110° C. in the course of the aging test at 160° C. (between 0 and 10 days).

| | Ex 1 | Ex 2 | Ex 3 | Ex 4 | Viton ® | Shin Etsu ® KE 24 | Adilithe ® IV-95 |
|---|---|---|---|---|---|---|---|
| $\Delta\sigma_{rupt}$ (%) | | | | | | | |
| Between 0 and 24 hours | −17.6 | −18.38 | 3.5 | 27.1 | −4.09 | −30.1 | −46.97 |
| Between 0 and 10 days | −37.21 | −38.72 | −7.55 | −3.02 | 13.31 | −28.32 | −77.75 |
| Between 24 h and 10 days | −23.72 | −24.93 | −10.66 | −23.7 | 18.14 | 2.52 | −58.04 |
| $\Delta\epsilon_{rupt}$ (%) | | | | | | | |
| Between 0 and 24 h | 53 | 52.92 | 68.52 | 1 | −12.86 | −2.96 | −12.97 |
| Between 0 and 10 days | 5.76 | 6.16 | 78.06 | 9.93 | −9.75 | −8.27 | −87.28 |
| Between 24 h and 10 days | −30.87 | −30.57 | 5.66 | 8.89 | 3.57 | −5.47 | −84.25 |

The negative values express the decrease in the property and the positive values the increase in that property.

TABLE 5

Value of the variation in σrupt and εrupt calculated at 110° C. for polyurethaneurea based on polyol C36 in the course of the aging test at 160° C.

| | C36/H12MDI/3-DCM (D2000/T5000) |
|---|---|
| $\Delta\sigma_{rupt}$ (%) | |
| Between 0 and 24 h | −53.38 |
| Between 0 and 3 days | −62.23 |
| Between 24 h and 3 days | −18.98 |
| $\Delta\epsilon_{rupt}$ (%) | |
| Between 0 and 24 h | −72.28 |
| Between 0 and 3 days | −92.12 |
| Between 24 h and 3 days | −71.6 |

TABLE 6

Average values of the deviations in stress and deformation at break, calculated over examples 1 to 4 according to the invention.

| Average value | $\Delta\sigma_{rupt}$ (%) | $\Delta\epsilon_{rupt}$ (%) |
|---|---|---|
| Between 0 and 10 days | −22% | 25% |
| Between 24 h and 10 days | −20.75% | −11.80% |

These results clearly demonstrate the thermal stability of the compositions according to the invention in the course of the aging test at 160° C.

The higher the silica content, the greater the increase in stress at break and the greater the decrease in elongation at break.

In comparison with other thermally stable materials (Shin Etsu®KE 24 and viton® silicones), it is apparent that the compositions according to the invention containing 20% or 27% silica are within the range of values of these materials.

The composition according to the invention containing 15% silica nevertheless provides a good elongation at break despite a lower stress at break. The compositions according to the invention are therefore thermally stable.

According to the average values of the deviations of the static mechanical properties, calculated over the examples according to the invention, it is apparent that they all have a variation of less than or equal to ±30% for the stress and for the deformation (between 0 and 10 days or between 1 and 10 days). This is very different from the deviations obtained with the polyurethaneurea of type C36/H12MDI/3-DCM (D2000/T5000) or the polyurethane of type Adilithe® IV-95, sold by SAMI, which are materials which are not thermally stable.

Example of Employing a Roller with the Composition of Example 4 According to the Invention 1. Mixing in a vessel of a portion of the reactants (Tegomer®6440+B10+catalyst) at approximately 80° C. for several minutes, time for the monomers to melt.

2. Calendering at approximately 80° C. of the above mixture, to which the remainder of the charge is gradually added.

3. The mixture obtained with the calender is subsequently passed into a single-screw extruder having a slot die (80° C. approximately) sited opposite a winder on which the roller to be coated is fixed (the roller is maintained at a sufficient heat that the material does not recrystallize). The respective speeds are regulated so that the strip of material is rolled up regularly without tearing.

4. The coated roller is subsequently placed in an oven for the complete thermal cycle of 6 h at 90° C., 8 h at 170° C., and 2 h at 200° C.

A roller coated with the composition according to the invention is thus obtained, which as a result is thermally stable in terms of the static mechanical properties.

The composition according to the invention is therefore very easy to employ.

What is claimed is:

1. A thermosetting elastomer composition based on modified polycyanurate with improved heat resistance, characterized in that it is obtainable by a process of polymerizing, in the presence of a catalyst (D), a mixture comprising at least:

(A) a cyanate, (B) a block copolymer composed of
  a) at least one central block (B1) which is not miscible with the cyanate and which is sufficiently long to give the composition an elastomeric nature, and
  b) at least two end blocks (B2) situated either side of the central block and containing groups which are reactive with the cyanate, each of the blocks (B2) being sufficiently long to be miscible with the cyanate, and (C) a mineral filler which is reactive with the cyanate in proportions such that the ratio r is at least 5, but remains below a limit value to prevent phase inversion, said process comprising the steps of:

I—mixing (A), (B), (C) and (D) to give a homogeneous mixture at a temperature greater than the melting temperature of (A) and (B) but less than approximately 130° C., II—polymerizing the mixture at a temperature of between approximately 130 and approximately 170° C., III—postcuring the polymerized mixture at a temperature greater than or equal to approximately 200° C., in order to complete the reaction and in that the $\Delta\sigma_{rupt}$ and $\Delta\epsilon_{rupt}$ values of the composition thus obtained are less than or equal to ±30%.

2. The composition according to claim 1, characterized in that after 10 days at 160° C. its $\epsilon_{rupt}$ measured at 110° C. is at least equal to approximately 40%.

3. The composition according to claim 1, characterized in that after 10 days at 160° C. its $\sigma_{rupt}$ measured at 110° C. is at least equal to approximately 3 Mpa.

4. The composition according to claim 1, characterized in that the block (B1) of the copolymer (D) is of the polysiloxane type.

5. The composition according to claim 1, characterized in that the copolymer (B) is a polycaprolactone-polydimethylsiloxane copolymer.

6. The composition according to claim 1, characterized in that the filler (C) is hydroxy-functionalized silica.

7. A process for preparing a composition according to claim 1, characterized in that it comprises the steps of:

I—mixing (A), (B), (C) and (D) to give a homogenous mixture at a temperature greater than the melting temperature of (A) and (B) but less than approximately 130° C., II—polymerizing the mixture at a temperature of between approximately 130 and approximately 170° C., III—postcuring the polymerized mixture at a temperature greater than or equal to approximately 200° C., in order to complete the reaction.

8. The process according to claim 7, characterized in that the catalyst (D) used is copper acetylacetonate in nonylphenol, preferably in a proportion of 100 ppm.

9. The process according to claim 7, characterized in that step I is conducted at approximately 90° C. for approximately 6 h, step II at approximately 170° C. for approximately 8 h, and step III at approximately 200° C. for approximately 2 h.

10. The process according to claim 7, characterized in that step II is conducted in a press at approximately 170° C. for approximately 4 h and step III is conducted in a press at approximately 200° C. for approximately 2 h.

11. A coating for rollers made from the composition of claim 1.

12. An encapsulant for semiconductors made from the composition of claim 1.

13. A substrate for a microelectronic device made from the composition of claim 1.

14. A binder for propellants or composites made from the composition of claim 1.

* * * * *